United States Patent
Basset et al.

(10) Patent No.: US 11,701,644 B2
(45) Date of Patent: *Jul. 18, 2023

(54) CATALYST SYSTEMS AND METHODS OF SYNTHESIZING CATALYST SYSTEMS

(71) Applicants: Saudi Arabian Oil Company, Dhahran (SA); King Abdullah University of Science and Technology, Thuwal (SA)

(72) Inventors: Jean Marie Basset, Thuwal (SA); Pradeep Kumar Doggali, Thuwal (SA); Ola S. Ali, Thuwal (SA); Wei Xu, Thuwal (SA); Isidoro Morales Osorio, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 81 days.

This patent is subject to a terminal disclaimer.

(21) Appl. No.: 17/315,841

(22) Filed: May 10, 2021

(65) Prior Publication Data

US 2022/0355277 A1    Nov. 10, 2022

(51) Int. Cl.

| | |
|---|---|
| *B01J 29/40* | (2006.01) |
| *B01J 21/08* | (2006.01) |
| *C10G 11/05* | (2006.01) |
| *B01J 35/02* | (2006.01) |
| *B01J 35/10* | (2006.01) |

(Continued)

(52) U.S. Cl.
CPC ............. *B01J 29/40* (2013.01); *B01J 21/08* (2013.01); *B01J 23/75* (2013.01); *B01J 35/0006* (2013.01); *B01J 35/023* (2013.01); *B01J 35/1019* (2013.01); *B01J 35/1023* (2013.01); *B01J 35/1038* (2013.01); *B01J 35/1042* (2013.01); *B01J 35/1061* (2013.01); *B01J 37/04* (2013.01); *B01J 37/06* (2013.01); *B01J 37/082* (2013.01); *B01J 37/10* (2013.01); *B01J 37/18* (2013.01); *C10G 11/05* (2013.01); *C10G 2300/70* (2013.01); *C10G 2400/20* (2013.01)

(58) Field of Classification Search
CPC ........ B01J 21/08; B01J 29/40; B01J 35/0006; B01J 35/023; C10G 11/05
See application file for complete search history.

(56) References Cited

U.S. PATENT DOCUMENTS

2017/0001176 A1*  1/2017  D'Souza .............. B01J 35/023
2018/0280955 A1* 10/2018  Al-Khattaf ............ B01J 21/08

FOREIGN PATENT DOCUMENTS

WO       2019035045 A1     2/2019

OTHER PUBLICATIONS

Akah et al., "Maximizing propylene production via FCC technology", Appl Petrochem Res, DOI 10.1007/s13203-015-0104-3, Mar. 4, 2015.

(Continued)

*Primary Examiner* — Renee Robinson
(74) *Attorney, Agent, or Firm* — Dinsmore & Shohl LLP (57) ABSTRACT

Embodiments of catalyst systems and methods of synthesizing catalyst systems are provided. The catalyst system may include a core comprising a zeolite; and a shell comprising a microporous fibrous silica. The shell may be in direct contact with at least a majority of an outer surface of the core. The catalyst system may have a Si/Al molar ratio greater than 5. At least a portion of the shell may have a thickness of from 50 nanometers (nm) to 600 nm.

13 Claims, 3 Drawing Sheets

(51) Int. Cl.
  B01J 35/00    (2006.01)
  B01J 37/04    (2006.01)
  B01J 37/06    (2006.01)
  B01J 37/10    (2006.01)
  B01J 37/08    (2006.01)
  B01J 37/18    (2006.01)
  B01J 23/75    (2006.01)

(56) References Cited

OTHER PUBLICATIONS

Alamri et al., "Self-cleaning superhydrophobic epoxy coating based on fibrous silica-coated iron oxide magnetic nanoparticles", Journal of Colloid and Interface Science, vol. 513, pp. 349-356, 2018.

Atabaev et al., "Mesoporous silica with fibrous morphology: A multifunctional core-shell platform for biomedical applications", Nanotechnology, vol. 24, 345603 (7pp), 2013.

Aziz et al., "Controllable structure of fibrous SiO2-ZSM-5 support decorated with TiO2 catalysts for enhanced photodegradation of paracetamol", Applied Surface Science, vol. 455, pp. 84-95, 2018.

Barzetti et al., "Pyridine and ammonia as probes for FTIR analysis of solid acid catalysts", J. Chem. Soc., Faraday Trans., vol. 92, No. 8, pp. 1401-1407, 1996.

Choi et al., "A facile approach for preparation of tunable acid nano-catalysts with hierarchically mesoporous structure", The Royal Society of Chemistry, DOI: 10.1039/c0xx00000x, 2014.

Chong et al., "Dry reforming of methane over Ni/dendritic fibrous SBA-15 (Ni/DFSBA-15): Optimization, mechanism, and regeneration studies", International Journal of Hydrogen Energy, vol. 45, pp. 8507-8525, 2020.

Chong et al., "Facile synthesis of tunable dendritic fibrous SBA-15 (SFSBA-15) with radial wrinkle structure", Microporous and Mesoporous Materials, vol. 294, 109872, 2020.

Fauzi et al., "Altering fiber density of cockscomb-like fibrous silica-titania catalysts for enhanced photodegradation of ibuprofen", Journal of Environmental Management, vol. 227, pp. 34-43, 2018.

Firmansyah et al., "Synthesis and characterization of fibrous silica ZSM-5 for cumene hydrocracking", Catalysis Science and Technology, vol. 6, 5178-5182, 2016.

Firmansyah et al., "Supplementary Information—Synthesis and characterization of fibrous silica ZSM-5 for cumene hydrocracking", Catalysis Science and Technology, vol. 6, 5178-5182, 2016.

Ghani et al., "Tailored mesoporosity and acidity of shape-selective fibrous silica beta zeolite for enhanced toluene co-reaction with methanol", Chemical Engineering Science, vol. 193, pp. 217-229, 2019.

Hambali et al., "Unique structure of fibrous ZSM-5 catalyst expedited prolonged hydrogen atom restoration for selective production of propylene from methanol", International Journal of Hydrogen Energy, https://doi.org/10.1016/j.jhydene.2019.11.236, Nov. 19, 2019.

Hussain et al., "New insights on the effect of the H2/Co ratio for enhancement of CO methanation over metal-free fibrous silica ZSM-5: Thermodynamic and mechanistic studies", Energy Conversion and Management, vol. 199, 112056, 2019.

Hyde, "Light olefins market review", Foro Pemex Petroquimica, Mexico 2012.

Ibrahim et al., "Enhanced n-hexane hydroisomerization over bicontinuous lamellar silica mordenite supported platinium (Pt/HM@KCC-1) catalyst", International Journal of Hydrogen Energy, vol. 45, pp. 18587-18599, 2020.

Izan et al., "Additional Lewis acid sites of protonated fibrous silica@BEA zeolite (HSi@BEA) improving the generation of protonic acid sites in the isomerization of C6 alkane and cycloalkanes", Applied Catalysis A, General, vol. 570, pp. 228-237, 2019.

Jung et al., "Effect of copper surface area and acidic sites to intrinsic catalytic activity for dimethyl ether synthesis from biomass-derived syngas", Applied Catalysis B: Environmental, vol. 126, pp. 1-8, 2012.

Le et al., "Palladium nanoparticles immobilized on core-shell magnetic fibrous as highly efficient and recyclable heterogeneous catalyst for reduction of 4-nitrophenol and Suzuki coupling reactions", Journal of Materials Chemistry A, vol. 2, No. 46, pp. 19696-19706, 2014.

Ma et al., "The influence of straight pore blockage on the selectivity of methanol to aromatics in nanosized Zn/ZSM-5: an atomic Cs-corrected STEM analysis study", RSC advances, vol. 6, No. 78, pp. 74797-74801, 2016.

Park et al., "IR study on methanol-to-olefin reaction over zeolites with different pore structures and acidities", Applied Catalysis A: General, vol. 356, pp. 180-188, 2009.

Peng et al., "One-Pot synthesis of benzamide over a robust tandem catalyst based on center radially fibrous silica encapsulated TS-1", The Royal Society of Chemistry, vol. 49, pp. 2709-2711, 2013.

Peng et al., "One-pot synthesis of primary amides on bifunctional Rh(OH)x/TS-1@KCC-1 catalysts", Chinese Journal of Catalysis, vol. 34, pp. 2057-2065, 2013.

Prasad et al., "Single-step synthesis of DME from syngas on Cu—ZnO-Al2O3/zeolite bifunctional catalysts: The superority of ferrierite over the other zeolites", Fuel Processing Technology, vol. 89, pp. 1281-1286, 2008.

Qian et al., "Supplemental Information: Controllable fabrication of uniform core-shell structured zeolite@SBA-15 composites", The Royal Society of Chemistry, 2011.

Qu et al., "Silica Microspheres with Fibrous Shells: Synthesis and Application in HPLC", Analytical Chemistry, vol. 87, pp. 9631-9638, Aug. 30, 2015.

Radhakrishnan et al., "A hybrid magnetic core-shell fibrous silica nanocomposite for a chemosensor-based highly effective fluorescent detection of Cu(II)", Royal Chemistry of Chemistry, vol. 7, pp. 45824-45833, 2017.

Rostamizadeh et al., "Bifunctional and bimetallic Fe/ZSM-5 nanocatalysts for methanol to olefin reaction", Fuel, vol. 181, pp. 537-546, 2016.

Sun et al., "A multifunctional magnetic core-shell fibrous silica sensing probe for highly sensitive detection and removal of Zn2+ from aqueous solution", Royal Society of Chemistry, Journal of Material Chemistry C, vol. 3, pp. 4713-4722, 2015.

Teh et al., "Fibrous silica mesoporous ZSM-5 for carbon monoxide methanation", Applied Catalysis A: General, vol. 523, pp. 200-208, 2016.

Yang et al., "Enhanced aromatic selectivity by the sheet-like ZSM-5 in syngas conversion", Journal of Energy Chemistry, vol. 35, pp. 44-48, 2019.

Yu et al., "Synthesis of fibrous monodisperse core-shell Fe3O4/SiO2/KCC-1", Materials Letters, vol. 106, pp. 151-154, 2013.

\* cited by examiner

CATALYST SYSTEMS AND METHODS OF SYNTHESIZING CATALYST SYSTEMS

TECHNICAL FIELD

Embodiments of the present disclosure generally relate to catalyst systems and more specifically relate to catalyst systems for the processing of petroleum based feeds.

BACKGROUND

In recent years, the demand for light olefins, including ethylene and propylene, has increased dramatically to feed the growing markets for polyethylene, polypropylene, propylene oxide and acrylic acid. Currently, most of the propylene produced worldwide is a by-product from steam cracking and Fluid Catalytic Cracking (FCC) of Naphtha. Additionally, olefin metathesis is considered to be a useful reaction to shift the composition of a pool of low-value butenes to meet market demand for propylene.

SUMMARY

The catalytic cracking of crude oil to produce light olefins has been receiving more attention in the petroleum industries, and great efforts have been devoted to maximizing the selectivity of light olefins during catalytic cracking processes. Attempts to maximize selectivity involve integrating additional functionalities (such as pre-cracking, desulfurization, and denitrogenation) into zeolite-based catalysts.

Accordingly, ongoing needs exist for catalyst systems, which allow for the selective production of light olefins by integrating additional functionalities (such as pre-cracking, desulfurization, and denitrogenation) into zeolite-based catalysts.

To address these needs, catalyst systems and methods of synthesizing catalyst systems are disclosed, which include a core-shell morphology and where the shell includes a mesoporous fibrous silica. The zeolite core may provide catalytic sites for cracking functionalities, and the mesoporous fibrous silica shell may provide catalytic sites for one or more additional functionalities, such as pre-cracking, desulfurization, demetallization, and denitrogenation functionalities. Additionally, the core-shell structure itself may enable the spatial separation of these different types of catalytic active sites and their utilization in a sequential manner. The shell may be composed of acidic sites that can be used to pre-crack the crude oil large molecules or trap metals in crude oil feedstock. The pre-cracking fragments that pass through the shell can then easily diffuse into the micropores of the zeolite core, where they can be further cracked into smaller molecules. Additionally or alternatively, the crude oil feedstock may undergo desulfurization and denitrogenation over the corresponding catalytic active sites of the shell before the final cracking takes place at the acid sites in the zeolite core. For example, when utilizing the disclosed catalyst systems in catalytic cracking processes, the crude oil feedstock may undergo desulfurization and denitrogenation over the corresponding catalytic active sites of the shell before a cracking step takes place at the acid sites in the zeolite core.

According to one or more embodiments, catalyst systems are provided. Embodiments of the catalyst system may include a core comprising a zeolite and a shell comprising a microporous fibrous silica. The shell may be in direct contact with at least a majority of an outer surface of the core. The catalyst system may have a Si/Al molar ratio greater than 5. At least a portion of the shell may have a thickness of from 50 nanometers (nm) to 600 nm.

According to one or more embodiments, a method of synthesizing a catalyst system having a core-shell morphology is provided. The method may include mixing cetyltrimethylammonium bromide, urea, and water to produce a first solution; mixing a hydrocarbon solvent, tetraethyl orthosilicate, and a co-solvent to produce a second solution; mixing the first solution and the second solution to produce a mixture; hydrothermally treating the mixture to produce a treated mixture; combining an aluminum precursor and the treated mixture to produce a reaction solution; and hydrothermally treating the reaction solution to produce the catalyst system.

According to one or more embodiments, a method for converting hydrocarbons is provided. The method may include contacting a feed with a catalyst system comprising a core and a shell. The core may comprise a zeolite. The shell may comprise a microporous fibrous silica. The shell may be in direct contact with at least a majority of an outer surface of the core. The catalyst system may have a Si/Al molar ratio greater than 5. At least a portion of the shell may have a thickness of from 50 nanometers (nm) to 600 nm. The shell may pre-crack the feed to produce a pre-cracked feed, and the core may crack the feed to produce light olefins. In embodiments, the feed may be crude oil.

Additional features and advantages of the present embodiments will be set forth in the detailed description, which follows, and in part will be readily apparent to those skilled in the art from that description or recognized by practicing the described embodiments, including the detailed description that follows, the claims, as well as the appended drawings.

DETAILED DESCRIPTION

Embodiments of the present disclosure are directed to catalyst systems, methods of synthesizing catalyst systems, and methods for utilizing catalyst systems.

As stated previously, embodiments of the catalyst systems described herein may have a core-shell morphology. Without being bound by theory, the core-shell morphology of the catalyst systems may provide additional functionalities (such as pre-cracking, desulfurization, and denitrogenation functionalities) as compared to zeolite-based catalysts that do not have a core-shell morphology. For example, when utilized in crude oil catalytic cracking processes, the shell of the core-shell morphology may facilitate the purification or pretreatment of crude oil feedstock.

The catalyst systems and processes described are applicable for a wide variety of heavy oil feeds, including crude oils, vacuum residue, tar sands, bitumen and vacuum gas oils using a catalytic hydrotreating pretreatment process. As used herein, "crude oil" may refer to a feedstock having an American Petroleum Institute (API) gravity of from 25 degrees to 50 degrees. For example, the heavy oil feed utilized may be Arab Heavy crude oil. The typical properties for an Arab Heavy crude oil are shown in Table 1.

TABLE A

Arab Heavy Export Feedstock.

| Analysis | Units | Value |
|---|---|---|
| American Petroleum Institute (API) gravity | degree | 27 |
| Density | grams per cubic centimeter (g/cm$^3$) | 0.8904 |
| Sulfur Content | Weight percent (wt. %) | 2.83 |
| Nickel | Parts per million by weight (ppmw) | 16.4 |
| Vanadium | ppmw | 56.4 |
| NaCl Content | ppmw | <5 |
| Conradson Carbon Residue (CCR) | wt. % | 8.2 |
| C5 Asphaltenes | wt. % | 7.8 |
| C7 Asphaltenes | wt. % | 4.2 |

Once the crude oil has traveled through and been pretreated by the shell, it may contact the acidic sites of core within the catalyst system, where the pretreated crude oil is subsequently cracked. Accordingly, the pre-cracking functionalities provided by the shell may allow for improved cracking functionalities provided by the core. Together, the core and the shell therefore allow for an improved overall yield of light olefins and other products.

Figure 1:
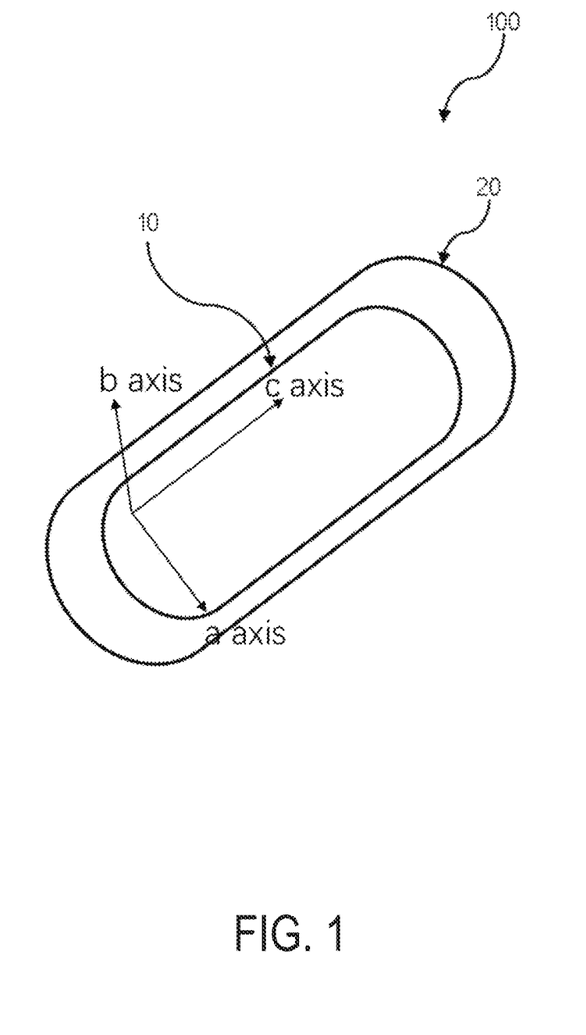
FIG. 1 depicts a catalyst system, in accordance with one or more embodiments described herein.

Embodiments of catalyst systems will now be described. Referring now to FIG. 1, the catalyst system 100 may have a core-shell type morphology, which includes a core 10 and shell 20. The core 10 may comprise a core material. The shell 20 may comprise a shell material. In embodiments, the shell 20 may surround at least a portion of the outer surface of the core 10. In further embodiments, the shell 20 may entirely surround the outer surface of the core 10. In embodiments, the core 10, comprising the core material, may be prepared separately from the shell 20. As described subsequently in more detail, in such embodiments, the shell material may then be synthesized to form a shell 20 around the prepared core 10.

The core material may include a zeolite. The zeolitic core may provide the cracking functionality as previously described. In embodiments, the zeolite may be a ZSM-5 zeolite, a TS-1 zeolite, a beta zeolite, a Y zeolite, a SBA-15 zeolite, a MCM-41 zeolite, and other zeolites known in the art. In further embodiments, the core material comprises a ZSM-5 zeolite.

A ZSM-5 zeolite is an aluminosilicate zeolite of a mordenite framework inverted (MFI) developed by Mobil and belonging to the pentasil family of zeolites, so called owing to rings of five silicon atoms prevalent in the zeolite framework. ZSM-5 and has a nominal chemical formula of $Na_nAl_nSi_{96-n}O_{192} \cdot 16H_2O$, where subscript n is from 0 to 27. The subscript n in the ZSM-5 thus indicates a silica-to-alumina ratio (SAR) of the zeolite. ZSM-5 zeolites may be produced having silica-to-alumina molar ratios (Si/Al ratio) as small as 12 and as large as approaching infinity if nearly all of the aluminum atoms are replaced by silicon. In embodiments, the ZSM-5 may have a Si/Al ratio of from 12 to 60, from 12 to 40, from 12 to 20, from 20 to 60, from 20 to 40, or from 40 to 60. The sodium ions in ZSM-5, of equal number to the number of aluminum atoms, maintain a neutral charge in the zeolite.

The ZSM-5 may also be defined by porosity. A micropore volume represents the specific volume corresponding to the microporous structure of ZSM-5. The pore size ranges for micropores are in conformity with conventionally understood size ranges for such pore classifications with micropores representing pores under 2 nanometers (nm) in diameter. A total pore volume would additionally include any mesopores and macropores, if present. In embodiments, the average pore size of the ZSM-5 is from 2 nm to 50 nm, from 2 nm to 40 nm, from 2 nm to 30 nm, from 2 nm to 20 nm, from 2 nm to 10 nm, from 10 nm to 50 nm, from 10 nm to 40 nm, from 10 nm to 30 nm, from 10 nm to 20 nm, from 20 nm to 50 nm, from 20 nm to 40 nm, from 20 nm to 30 nm, from 30 nm to 50 nm, from 30 nm to 40 nm, or from 40 nm to 50 nm.

In one or more embodiments, the ZSM-5 may have a surface area defined by a Brunauer-Emmett-Teller (BET) analysis ($S_{BET}$) of at least 300 square meters per gram (m$^2$/g), a $S_{BET}$ surface area of at least 325 m$^2$/g, or a $S_{BET}$ surface area of at least 350 m$^2$/g. In one or more embodiments, the ZSM-5 zeolite catalyst is a commercially available ZSM-5. For example, the ZSM-5 may be CBV3024E from Zeolyst International (Conshohocken, Pa., USA). Without being bound by theory, the surface area of the pores of the ZSM-5 may individually affect the butenes cracking reaction when utilized in a cracking unit. An increased surface area provides increased interaction between the individual catalyst components and the constituents of the crude oil passed into the core thereby allowing for increased conversion activity.

In embodiments, the core 10 may have a thickness along its b axis of from 110 nanometers (nm) to 140 nm, from 110 nm to 130 nm, from 110 nm to 120 nm, from 120 nm to 140 nm, from 120 nm to 130 nm, or from 130 nm to 140 nm.

Embodiments of the shell 20 will now be described. As stated previously, the shell 20 may accommodate one or more of pre-cracking, desulfurization, demetallization, and denitrogenation functionalities. The functionalities of the shell 20 may allow for enhanced cracking within the core 10.

The shell material of the catalyst system 100 described herein may include a mesoporous, fibrous silica. As used herein a "mesoporous fibrous silica" refers to a zeolite having fibers that are porous in nature or a zeolite having channel-like mesopores. In embodiments, mesoporous fibrous silica may have mesopores with an average pore size of from 2 to 50 nm. The presently disclosed mesoporous fibrous silicas may have an average pore size of greater than 2 nm, such as from 4 nm to 16 nm, from 6 nm to 14 nm, from 8 nm to 12 nm, or from 9 nm to 11 nm. In some embodiments, the majority of the mesopores may be greater than 8 nm, greater than 9 nm, or even greater than 10 nm. The mesopores of the mesoporous fibrous silicas described may range from 2 nm to 40 nm, and the median pore size may be from 8 to 12 nm. Without being bound by theory, bulky substrate molecules of crude oil (including, for example, 1,3,5-triisopropylbenzene, naphtalenes, naptha, kerosene, and substituted aromatics) may diffuse faster and more easily into the mesoporous channels of the mesoporous fibrous silica, in comparison to silicas having micropores or silicas having mesopores that are not fibrous. Accordingly, the shell 20 of embodiments of the catalyst system 100 described herein can provide pre-cracking functionalities, which crack the bulky reactant molecules of crude oil and convert them into small molecules before entering into the micropores of the core 10 for further reaction.

In further embodiments, the mesoporous, fibrous silica may include KCC-1. KCC-1 is a mesoporous fibrous silica having a surface area of from 400 m$^2$/g to 800 m$^2$/g, from 400 m$^2$/g to 700 m$^2$/g, from 400 m$^2$/g to 600 m$^2$/g, from 600 m$^2$/g to 800 m$^2$/g, from 600 m$^2$/g to 700 m$^2$/g, or from 700 m$^2$/g to 800 m$^2$/g and an average pore size of from 5 nm to 10 nm, from 5 nm to 9 nm, from 5 nm to 8 nm, from 5 nm to 7 nm, from 5 nm to 6 nm, from 6 nm to 10 nm, from 6 nm to 9 nm, from 6 nm to 8 nm, from 6 nm to 7 nm, from 7 nm to 10 nm, from 7 nm to 9 nm, from 7 nm to 8 nm, from 8 nm to 10 nm, from 8 nm to 9 nm, or from 9 nm to 10 nm.

In embodiments, at least a portion of the shell 20 may have a thickness of from 50 nanometers (nm) to 360 nm, from 50 nm to 350 nm, from 50 nm to 300 nm, from 50 nm to 250 nm, from 50 nm to 200 nm, from 50 nm to 150 nm, from 50 nm to 100 nm, from 50 nm to 90 nm, from 90 nanometers (nm) to 360 nm, from 90 nm to 350 nm, from 90 nm to 300 nm, from 90 nm to 250 nm, from 90 nm to 200 nm, from 90 nm to 150 nm, from 90 nm to 100 nm, from 100 nm to 360 nm, from 100 nm to 350 nm, from 100 nm to 300 nm, from 100 nm to 250 nm, from 100 nm to 200 nm, from 100 nm to 150 nm, from 150 nm to 360 nm, from 150 nm to 350 nm, from 150 nm to 300 nm, from 150 nm to 250 nm, from 150 nm to 200 nm, from 200 nm to 360 nm, from 200 nm to 350 nm, from 200 nm to 300 nm, from 200 nm to 250 nm, from 250 nm to 360 nm, from 250 nm to 350 nm, from 250 nm to 300 nm, from 300 nm to 360 nm, from 300 nm to 350 nm, or from 350 nm to 360 nm. Without being bound by theory, a greater shell thickness may allow for a shell 20 having improved thermal and mechanical stability. Furthermore, in embodiments, having a thicker shell may allow for increase increased pre-cracking functionalities, which subsequently allow for an improved overall yield of light olefins and other products.

In embodiments, the shell 20 may include heteroatoms, such as aluminum (Al), boron (B), gallium (Ga); titanium (Ti); zirconium (Zr); and hafnium (HO, which are incorporated into the shell material. The heteroatoms may be incorporated into the mesoporous fibrous silica during the synthesis process, which increases the surface acidity of the shell 20 due to the formation of the Lewis and/or Bronsted acidic sites. Without being bound by theory, increasing the amount of acidic sites may increase the pre-cracking functionalities, which may improve the overall yield of light olefins and other products.

In one or more embodiments, the catalyst system 100 may further comprise one or more metallic nanoparticles supported on the shell 20. The one or more metallic nanoparticles may include nickel, cobalt, or platinum. Without being bound by theory, alumina incorporation may allow for pre-cracking functionalities to be imparted into the catalyst system, and metallic nanoparticle incorporation may allow for Sulphur and Nitrogen capturing functionalities to be imparted into the catalyst system. In embodiments, the catalyst system 100 may include up to 10 wt. % of the one or more metallic nanoparticles, based on the total weight of the catalyst system. In embodiments, the catalyst system 100 may include from 0.1 wt. % to 10 wt. %, from 0.1 wt. % to 5 wt. %, from 0.1 wt. % to 1 wt. %, from 1 wt. % to 10 wt. %, from 1 wt. % to 5 wt. %, or from 5 wt. % to 10 wt. % of the one or more metallic nanoparticles, based on the total weight of the catalyst system.

The properties of the catalyst systems described herein may be tunable by controlling the synthesis parameters for producing the shell 20. The synthesis parameters may allow for precise control of one or more of the shell thickness, shell density, and surface acidity of the shell 20. In embodiments, parameters such as temperature, solid/liquid ratio, and the concentration of components may impact the catalyst system 100 formed. For example, the thickness and density of the shell 20 may be tunable by controlling synthesis parameters such as the amount of co-solvent or the manner by which the heteroatom is incorporated into the catalyst system 100. Embodiments, of producing the shell material include introducing the heteroatom into the shell material by post-synthetic modification methods.

To produce the shell 20, an aqueous solution of cetyltrimethylammonium bromide (CTAB) and urea may be prepared. In embodiments the CTAB and urea may be combined with water in a vessel. The vessel containing the CTAB, urea, and water may be stirred at a speed of from 500 rpm to 3000 rpm, from 500 rpm to 2500 rpm, from 500 rpm to 2000 rpm, from 500 rpm to 1500 rpm, from 500 rpm to 1000 rpm, from 1000 rpm to 3000 rpm, from 1000 rpm to 2500 rpm, from 1000 rpm to 2000 rpm, from 1000 rpm to 1500 rpm, from 1500 rpm to 3000 rpm, from 1500 rpm to 2500 rpm, from 1500 rpm to 2000 rpm, from 2000 rpm to 3000 rpm, from 2000 rpm to 2500 rpm, or from 2500 rpm to 3000 rpm and from a time period of from 0.1 hours to 3 hours, from 0.1 hours to 2 hours, from 0.1 hours to 1 hour, from 0.1 hours to 0.5 hours, from 0.5 hours to 3 hours, from 0.5 hours to 2 hours, from 0.5 hours to 1 hour, from 1 hours to 3 hours, from 1 hour to 2 hours, or from 2 hours to 3 hours. In embodiments, the aqueous solution may include from 0.01 wt. % to 5 wt. %, from 0.01 wt. % to 4 wt. %, from 0.01 wt. % to 3 wt. %, from 0.01 wt. % to 2 wt. %, from 0.01 wt. % to 1 wt. %, from 0.01 wt. % to 0.1 wt. %, from 0.1 wt. % to 5 wt. %, from 0.1 wt. % to 4 wt. %, from 0.1 wt. % to 3 wt. %, from 0.1 wt. % to 2 wt. %, or from 0.1 wt. % to 1 wt. %, CTAB based on the total weight of the aqueous solution. In embodiments, the aqueous solution may include from 0.01 wt. % to 5 wt. %, from 0.01 wt. % to 4 wt. %, from 0.01 wt. % to 3 wt. %, from 0.01 wt. % to 2 wt. %, from 0.01 wt. % to 1 wt. %, from 0.01 wt. % to 0.1 wt. %, from 0.1 wt. % to 5 wt. %, from 0.1 wt. % to 4 wt. %, from 0.1 wt. % to 3 wt. %, from 0.1 wt. % to 2 wt. %, or from 0.1 wt. % to 1 wt. % urea, based on the total weight of the aqueous solution. In embodiments, the balance of the aqueous solution may be water.

In embodiments, an oil solution may be prepared by combining ZSM-5, a solvent, a co-solvent, and TEOS. The solvent may be cyclohexane. The co-solvent may be 1-pentanol. The vessel containing the ZSM-5, solvent, co-solvent, and TEOS may be stirred at a speed of from 500 rpm to 3000 rpm, from 500 rpm to 2500 rpm, from 500 rpm to 2000 rpm, from 500 rpm to 1500 rpm, from 500 rpm to 1000 rpm, from 1000 rpm to 3000 rpm, from 1000 rpm to 2500 rpm, from 1000 rpm to 2000 rpm, from 1000 rpm to 1500 rpm, from 1500 rpm to 3000 rpm, from 1500 rpm to 2500 rpm, from 1500 rpm to 2000 rpm, from 2000 rpm to 3000 rpm, from 2000 rpm to 2500 rpm, or from 2500 rpm to 3000 rpm and from a time period of from 0.1 hours to 3 hours, from 0.1 hours to 2 hours, from 0.1 hours to 1 hour, from 0.1 hours to 0.5 hours, from 0.5 hours to 3 hours, from 0.5 hours to 2 hours, from 0.5 hours to 1 hour, from 1 hours to 3 hours, from 1 hour to 2 hours, or from 2 hours to 3 hours. The oil solution may include from 1 wt. % to 10 wt. %, from 1 wt. % to 8 wt. %, from 1 wt. % to 6 wt. %, from 1 wt. % to 4 wt. %, from 1 wt. % to 2 wt. %, from 2 wt. % to 10 wt. %, from 2 wt. % to 8 wt. %, from 2 wt. % to 6 wt. %, from 2 wt. % to 4 wt. %, from 4 wt. % to 10 wt. %, from 4 wt. % to 8 wt. %, from 4 wt. % to 6 wt. %, from 6 wt. % to 10 wt. %, from 6 wt. % to 10 wt. %, from 6 wt. % to 8 wt. %, or from 8 wt. % to 10 wt. % of the co-solvent, based on the total weight of the oil solution. The oil solution may include from 0.5 wt. % to 10 wt. %, from 0.5 wt. % to 8 wt. %, from 0.5 wt. % to 6 wt. %, from 0.5 wt. % to 4 wt. %, from 0.5 wt. % to 2 wt. %, from 2 wt. % to 10 wt. %, from 2 wt. % to 8 wt. %, from 2 wt. % to 6 wt. %, from 2 wt. % to 4 wt. %, from 4 wt. % to 10 wt. %, from 4 wt. % to 8 wt. %, from 4 wt. % to 6 wt. %, from 6 wt. % to 10 wt. %, from 6 wt. % to 10 wt. %, from 6 wt. % to 8 wt. %, or from 8 wt. % to 10 wt. % of TEOS, based on the total weight of the oil solution. In embodiments, the balance of oil solution may be a hydrocarbon solvent, such as cyclohexane.

In embodiments, the aqueous solution and the oil solution may be combined to produce an emulsion. In embodiments, the aqueous solution and the oil solution may be combined by mixing at a speed of from 500 rpm to 6000 rpm, from 500 rpm to 5000 rpm, from 500 rpm to 4000 rpm, from 500 rpm to 3000 rpm, from 500 rpm to 2500 rpm, from 500 rpm to 2000 rpm, from 500 rpm to 1500 rpm, from 500 rpm to 1000 rpm, from 1000 rpm to 6000 rpm, from 1000 rpm to 5000 rpm, from 1000 rpm to 4000 rpm, from 1000 rpm to 3000 rpm, from 1000 rpm to 2500 rpm, from 1000 rpm to 2000 rpm, from 1000 rpm to 1500 rpm, from 1500 rpm to 6000 rpm, from 1500 rpm to 5000 rpm, from 1500 rpm to 4000 rpm, from 1500 rpm to 3000 rpm, from 1500 rpm to 2500 rpm, from 1500 rpm to 2000 rpm, from 2000 rpm to 6000 rpm, from 2000 rpm to 5000 rpm, from 2000 rpm to 4000 rpm, from 2000 rpm to 3000 rpm, from 2000 rpm to 2500 rpm, from 2500 rpm to 6000 rpm, from 2500 rpm to 5000 rpm, from 2500 rpm to 4000 rpm, from 2500 rpm to 3000 rpm, from 3000 rpm to 6000 rpm, from 3000 rpm to 5000 rpm, from 3000 rpm to 4000 rpm, from 4000 rpm to 6000 rpm, from 4000 rpm to 5000 rpm, or from 5000 rpm to 6000 rpm, and from a time period of from 0.1 hours to 3 hours, from 0.1 hours to 2 hours, from 0.1 hours to 1 hour, from 0.1 hours to 0.5 hours, from 0.5 hours to 3 hours, from 0.5 hours to 2 hours, from 0.5 hours to 1 hour, from 1 hours to 3 hours, from 1 hour to 2 hours, or from 2 hours to 3 hours.

The emulsion may be hydrothermally treated to obtain the core-shell structure. In embodiments, the emulsion may be transferred to a hydrothermal reactor and heated to a temperature of from 20° C. to 300° C., from 20° C. to 200° C., from 20° C. to 180° C., from 20° C. to 160° C., from 20° C. to 140° C., from 20° C. to 120° C., from 20° C. to 100° C., from 20° C. to 80° C., from 20° C. to 60° C., from 20° C. to 40° C., from 40° C. to 300° C., from 40° C. to 200° C., from 40° C. to 180° C., from 40° C. to 160° C., from 40° C. to 140° C., from 40° C. to 120° C., from 40° C. to 100° C., from 40° C. to 80° C., from 40° C. to 60° C., from 60° C. to 300° C., from 60° C. to 200° C., from 60° C. to 180° C., from 60° C. to 160° C., from 60° C. to 140° C., from 60° C. to 120° C., from 60° C. to 100° C., from 60° C. to 80° C., from 80° C. to 300° C., from 80° C. to 200° C., from 80° C. to 180° C., from 80° C. to 160° C., from 80° C. to 140° C., from 80° C. to 120° C., from 80° C. to 100° C., from 100° C. to 300° C., from 100° C. to 200° C., from 100° C. to 180° C., from 100° C. to 160° C., from 100° C. to 140° C., from 100° C. to 120° C., from 120° C. to 300° C., from 120° C. to 200° C., from 120° C. to 180° C., from 120° C. to 160° C., from 120° C. to 140° C., from 140° C. to 300° C., from 140° C. to 200° C., from 140° C. to 180° C., from 140° C. to 160° C., from 160° C. to 300° C., from 160° C. to 200° C., from 160° C. to 180° C., from 180° C. to 300° C., from 180° C. to 200° C., or from 200° C. to 300° C. The emulsion may be heated in the hydrothermal reactor for a time period of from 0.5 hours to 5 hours, from 0.5 hours to 4.5 hours, from 0.5 hours to 4 hours, from 0.5 hours to 3.5 hours, from 0.5 hours to 3 hours, from 0.5 hours to 2.5 hours, from 0.5 hours to 2 hours, from 0.5 hours to 1.5 hours, from 0.5 hours to 1 hour, from 1 hour to 5 hours, from 1 hour to 4.5 hours, from 1 hour to 4 hours, from 1 hour to 3.5 hours, from 1 hour to 3 hours, from 1 hour to 2.5 hours, from 1 hour to 2 hours, from 1 hour to 1.5 hours, from 1.5 hours to 5 hours, from 1.5 hours to 4.5 hours, from 1.5 hours to 4 hours, from 1.5 hours to 3.5 hours, from 1.5 hours to 3 hours, from 1.5 hours to 2.5 hours, from 1.5 hours to 2 hours, from 2 hours to 5 hours, from 2 hours to 4.5 hours, from 2 hours to 4 hours, from 2 hours to 3.5 hours, from 2 hours to 3 hours, from 2 hours to 2.5 hours, from 2.5 hours to 5 hours, from 2.5 hours to 4.5 hours, from 2.5 hours to 4 hours, from 2.5 hours to 3.5 hours, from 2.5 hours to 3 hours, from 3 hours to 5 hours, from 3 hours to 4.5 hours, from 3 hours to 4 hours, from 3 hours to 3.5 hours, from 3.5 hours to 5 hours, from 3.5 hours to 4.5 hours, from 3.5 hours to 4 hours, from 4 hours to 5 hours from 4 hours to 4.5 hours, or from 4.5 hours to 5 hours.

In embodiments, aluminum may be incorporated into the hydrothermally-treated emulsion. In embodiments, the aluminum may be incorporated via pH assisted delay synthesis in which a strong acid, such as HCl may be added dropwise until the emulsion reaches a pH of 5. Once the desired pH is obtained, an aluminum precursor may be added. In embodiments, the aluminum precursor may be aluminum sulfate octadecahydrate. After the aluminum precursor has been added, the mixture may be stirred for a time period of from 0.5 hours to 3 hours, from 0.5 hours to 2 hours, from 0.5 hours to 1 hour, from 1 hours to 3 hours, from 1 hour to 2 hours, or from 2 hours to 3 hours. The resulting reaction solution comprising the aluminum and hydrothermally-treated emulsion may then be transferred to a sealed hydrothermal reactor. The hydrothermal reactor may be heated at a ramping rate of from 1° C./minute to 10° C./minute, from 1° C./minute to 8° C./minute, from 1° C./minute to 6° C./minute, from 1° C./minute to 4° C./minute, from 1° C./minute to 2° C./minute, from 2° C./minute to 10° C./minute, from 2° C./minute to 8° C./minute, from 2° C./minute to 6° C./minute, from 2° C./minute to 4° C./minute, from 4° C./minute to 10° C./minute, from 4° C./minute to 8° C./minute, from 4° C./minute to 6° C./minute, from 6° C./minute to 10° C./minute, from 6° C./minute to 8° C./minute, or from 8° C./minute to 10° C./minute. The resulting reaction solution may be heated to a temperature of from 20° C. to 300° C., from 20° C. to 200° C., from 20° C. to 180° C., from 20° C. to 160° C., from 20° C. to 140° C., from 20° C. to 120° C., from 20° C. to 100° C., from 20° C. to 80° C., from 20° C. to 60° C., from 20° C. to 40° C., from 40° C. to 300° C., from 40° C. to 200° C., from 40° C. to 180° C., from 40° C. to 160° C., from 40° C. to 140° C., from 40° C. to 120° C., from 40° C. to 100° C., from 40° C. to 80° C., from 40° C. to 60° C., from 60° C. to 300° C., from 60° C. to 200° C., from 60° C. to 180° C., from 60° C. to 160° C., from 60° C. to 140° C., from 60° C. to 120° C., from 60° C. to 100° C., from 60° C. to 80° C., from 80° C. to 300° C., from 80° C. to 200° C., from 80° C. to 180° C., from 80° C. to 160° C., from 80° C. to 140° C., from 80° C. to 120° C., from 80° C. to 100° C., from 100° C. to 300° C., from 100° C. to 200° C., from 100° C. to 180° C., from 100° C. to 160° C., from 100° C. to 140° C., from 100° C. to 120° C., from 120° C. to 300° C., from 120° C. to 200° C., from 120° C. to 180° C., from 120° C. to 160° C., from 120° C. to 140° C., from 140° C. to 300° C., from 140° C. to 200° C., from 140° C. to 180° C., from 140° C. to 160° C., from 160° C. to 300° C., from 160° C. to 200° C., from 160° C. to 180° C., from 180° C. to 300° C., from 180° C. to 200° C., or from 200° C. to 300° C. The resulting reaction solution may be heated in the hydrothermal reactor for a time period of from 0.5 hours to 5 hours, from 0.5 hours to 4.5 hours, from 0.5 hours to 4 hours, from 0.5 hours to 3.5 hours, from 0.5 hours to 3 hours, from 0.5 hours to 2.5 hours, from 0.5 hours to 2 hours, from 0.5 hours to 1.5 hours, from 0.5 hours to 1 hour, from 1 hour to 5 hours, from 1 hour to 4.5 hours, from 1 hour to 4 hours, from 1 hour to 3.5 hours, from 1 hour to 3 hours, from 1 hour to 2.5 hours, from 1 hour to 2 hours, from 1 hour to 1.5 hours, from 1.5 hours to 5 hours, from 1.5 hours to 4.5 hours, from 1.5 hours to 4 hours, from 1.5 hours to 3.5 hours, from 1.5 hours to 3 hours, from 1.5 hours to 2.5 hours, from 1.5 hours to 2 hours, from 2 hours to 5 hours, from 2 hours to 4.5 hours, from 2 hours to 4 hours, from 2 hours to 3.5 hours, from 2 hours to 3 hours, from 2 hours to 2.5 hours, from 2.5 hours to 5 hours, from 2.5 hours to 4.5 hours, from 2.5 hours to 4 hours, from 2.5 hours to 3.5 hours, from 2.5 hours to 3 hours, from 3 hours to 5 hours, from 3 hours to 4.5 hours, from 3 hours to 4 hours, from 3 hours to 3.5 hours, from 3.5 hours to 5 hours, from 3.5 hours to 4.5 hours, from 3.5 hours to 4 hours, from 4 hours to 5 hours from 4 hours to 4.5 hours, or from 4.5 hours to 5 hours.

After heating in the hydrothermal reactor, solid product may be collected via centrifugation. The solid product may be washed. In embodiments, the solid product may be washed with water, acetone, ethanol, or combinations. In embodiments, the solid product may be washed one or more times, for example, two times or three times.

The washed solid product may be dried in a convection oven for a temperature of from 50° C. to 150° C., from 50° C. to 125° C., from 50° C. to 100° C., from 50° C. to 75° C., from 75° C. to 150° C., from 75° C. to 125° C., from 75° C. to 100° C., from 100° C. to 150° C., from 100° C. to 125° C., or from 125° C. to 150° C. Alternatively or additionally, the washed solid product may be air dried. The washed solid product may be dried at a time period of from 5 hours to 30 hours, from 5 hours to 25 hours, from 5 hours to 20 hours, from 5 hours to 15 hours, from 5 hours to 10 hours, from 10 hours to 30 hours, from 10 hours to 25 hours, from 10 hours to 20 hours, from 10 hours to 15 hours, from 15 hours to 30 hours, from 15 hours to 25 hours, from 15 hours to 20 hours, from 20 hours to 30 hours, from 20 hours to 25 hours, or from 25 hours to 30 hours.

Finally, to produce the catalyst system 100, the dried solid product may be calcined in air at a temperature of from 400° C. to 600° C., from 400° C. to 550° C., from 400° C. to 500° C., from 400° C. to 450° C., from 450° C. to 600° C., from 450° C. to 550° C., from 450° C. to 500° C., from 500° C. to 600° C., from 500° C. to 550° C., or from 550° C. to 600° C. for a time of from 2 hours to 10 hours, from 2 hours to 8 hours, from 2 hours to 6 hours, 2 hours to 4 hours, from 4 hours to 10 hours, from 4 hours to 8 hours, from 4 hours to 6 hours, from 6 hours to 10 hours, from 6 hours to 8 hours, or from 8 hours to 10 hours.

Finally, the one or more metallic nanoparticles may be added and supported on the shell 20. The one or more metallic nanoparticles may include nickel, cobalt, or platinum. In embodiments, nickel, cobalt, platinum or combinations may be incorporated in the shell via an ethylene glycol medium and using hydrazine as reducing agent. This may be followed by reduction in a hydrogen flow of from 1 ml/min to 10 ml/min, from 1 ml/min to 5 ml/min, or from 5 ml/min to 10 ml/min at a temperature of from 400° C. to 600° C., from 400° C. to 550° C., from 400° C. to 500° C., from 400° C. to 450° C., from 450° C. to 600° C., from 450° C. to 550° C., from 450° C. to 500° C., from 500° C. to 600° C., from 500° C. to 550° C., or from 550° C. to 600° C. for a time of from 2 hours to 10 hours, from 2 hours to 8 hours, from 2 hours to 6 hours, 2 hours to 4 hours, from 4 hours to 10 hours, from 4 hours to 8 hours, from 4 hours to 6 hours, from 6 hours to 10 hours, from 6 hours to 8 hours, or from 8 hours to 10 hours. In exemplary embodiments, the incorporation may be carried out by utilizing a solution of cobalt chloride dissolved in ethylene glycol.

In embodiments, the catalyst system 100 may have a BET surface area, calculated by the Brunauer Emmett-Teller (BET) method of less than 600 $m^2/g$. In further embodiments, the catalyst system 100 may have a BET surface area, calculated by the Brunauer Emmett-Teller (BET) method of from 400 $m^2/g$ to 580 $m^2/g$, from 400 $m^2/g$ to 560 $m^2/g$, from 400 $m^2/g$ to 540 $m^2/g$, from 400 $m^2/g$ to 520 $m^2/g$, from 400 $m^2/g$ to 500 $m^2/g$, from 400 $m^2/g$ to 480 $m^2/g$, from 400 $m^2/g$ to 460 $m^2/g$, from 400 $m^2/g$ to 440 $m^2/g$, from 400 $m^2/g$ to 420 $m^2/g$, from 420 $m^2/g$ to 600 $m^2/g$, from 420 $m^2/g$ to 580 $m^2/g$, from 420 $m^2/g$ to 560 $m^2/g$, from 420 $m^2/g$ to 540 $m^2/g$, from 420 $m^2/g$ to 520 $m^2/g$, from 420 $m^2/g$ to 500 $m^2/g$, from 420 $m^2/g$ to 480 $m^2/g$, from 420 $m^2/g$ to 460 $m^2/g$, from 420 $m^2/g$ to 440 $m^2/g$, from 440 $m^2/g$ to 600 $m^2/g$, from 440 $m^2/g$ to 580 $m^2/g$, from 440 $m^2/g$ to 560 $m^2/g$, from 440 $m^2/g$ to 540 $m^2/g$, from 440 $m^2/g$ to 520 $m^2/g$, from 440 $m^2/g$ to 500 $m^2/g$, from 440 $m^2/g$ to 480 $m^2/g$, from 440 $m^2/g$ to 460 $m^2/g$, from 460 $m^2/g$ to 600 $m^2/g$, from 460 $m^2/g$ to 580 $m^2/g$, from 460 $m^2/g$ to 560 $m^2/g$, from 460 $m^2/g$ to 540 $m^2/g$, from 460 $m^2/g$ to 520 $m^2/g$, from 460 $m^2/g$ to 500 $m^2/g$, from 460 $m^2/g$ to 480 $m^2/g$, from 480 $m^2/g$ to 600 $m^2/g$, from 480 $m^2/g$ to 580 $m^2/g$, from 480 $m^2/g$ to 560 $m^2/g$, from 480 $m^2/g$ to 540 $m^2/g$, from 480 $m^2/g$ to 520 $m^2/g$, from 480 $m^2/g$ to 500 $m^2/g$, from 500 $m^2/g$ to 600 $m^2/g$, from 500 $m^2/g$ to 580 $m^2/g$, from 500 $m^2/g$ to 560 $m^2/g$, from 500 $m^2/g$ to 540 $m^2/g$, from 500 $m^2/g$ to 520 $m^2/g$, from 520 $m^2/g$ to 600 $m^2/g$, from 520 $m^2/g$ to 580 $m^2/g$, from 520 $m^2/g$ to 560 $m^2/g$, from 520 $m^2/g$ to 540 $m^2/g$, from 540 $m^2/g$ to 600 $m^2/g$, from 540 $m^2/g$ to 580 $m^2/g$, from 540 $m^2/g$ to 560 $m^2/g$, from 560 $m^2/g$ to 600 $m^2/g$, from 560 $m^2/g$ to 580 $m^2/g$, or from 580 $m^2/g$ to 600 $m^2/g$.

In embodiments, the catalyst system 100 may have a total relative pore volume, calculated by the Barrett, Joyner, and Halenda (BJH) method of less than 1.00 $cm^3/g$. In further embodiments, the catalyst system 100 may have a total relative pore volume, calculated by the Barrett, Joyner, and Halenda (BJH) method of from 0.10 $cm^3/g$ to 1.00 $cm^3/g$, from 0.10 $cm^3/g$ to 0.80 $cm^3/g$, from 0.10 $cm^3/g$ to 0.60 $cm^3/g$, from 0.10 $cm^3/g$ to 0.40 $cm^3/g$, from 0.10 $cm^3/g$ to 0.20 $cm^3/g$, from 0.20 $cm^3/g$ to 1.00 $cm^3/g$, from 0.20 $cm^3/g$ to 0.80 $cm^3/g$, from 0.20 $cm^3/g$ to 0.60 $cm^3/g$, from 0.20 $cm^3/g$, to 0.40 $cm^3/g$, from 0.40 $cm^3/g$ to 1.00 $cm^3/g$, from 0.40 $cm^3/g$ to 0.80 $cm^3/g$, from 0.40 $cm^3/g$ to 0.60 $cm^3/g$, from 0.60 $cm^3/g$ to 1.00 $cm^3/g$, from 0.60 $cm^3/g$ to 0.80 $cm^3/g$, or from 0.80 $cm^3/g$ to 1.00 $cm^3/g$.

In embodiments, the catalyst system 100 may have an overall Si/Al molar ratio of from 40 to 200, from 40 to 150, from 40 to 100, from 40 to 50, from 50 to 200, from 50 to 150, from 50 to 100, from 100 to 200, from 100 to 150, or from 150 to 200.

Methods of utilizing embodiments of the catalyst system 100 will now be described. In some embodiments, the catalyst system 100 may be utilized as a catalyst in a methanol to olefins process. In embodiments, the catalyst system 100 may be utilized as a catalyst in a one-step crude oil catalytic cracking process. In embodiments, the catalyst system 100 may be utilized in one or more steps of a hydrocracking process. In further embodiments, the one or more steps of the hydrocracking process may include hydrodenitrogenation, hydrodesulphurization, hydrodemetallization, and hydrocracking steps that occur during a process of crude oil catalytic cracking to olefins and aromatics. In further embodiments, the catalyst system 100, and particularly the shell 20 of the catalyst system 100 may act as a catalytic support for metallic active sites, such as Co and Ni, which allow for improved capture and removal sulfur-containing—(e.g. dibenzothiophene) and nitrogen-containing (e.g. 2,6-dimethylpyridine) compounds by hydrogenation.

In one exemplary embodiment, a method for converting hydrocarbons may include contacting a feed with the catalyst system presently described. The catalyst system may comprise a core comprising a zeolite and a shell comprising a microporous fibrous silica, where the shell may be in direct contact with at least a majority of an outer surface of the core. The catalyst system may have a Si/Al molar ratio greater than 5. At least a portion of the shell may have a thickness of from 50 nanometers (nm) to 360 nm. The shell may pre-crack the feed to produce a pre-cracked feed; and The core may cracks the feed to produce light olefins. In embodiments, the feed may be crude oil.

Test Methods

Surface Area

The surface areas were calculated by the Brunauer Emmett-Teller (BET) method.

Pore Volume and Pore Diameter

The total relative pore volume and the average pore diameter were estimated from the amount of N2 adsorbed at P/P0=0.99 according to the Barrett, Joyner, and Halenda (BJH) method. (Barret E P, Joyner L J, Halenda P H, J. Am. Chem. Soc. 73 (1951) 373-380).

$N_2$ Physisorption

Nitrogen physisorption measurements were performed at −196° C. on a Micromeritics ASAP 2460.

Transmission-Electron Microscopy (TEM)

The primary particle size and morphology of core-shell samples were carried out by transmission electron microscopy (TEM). This task was accomplished by using a double aberration corrected (double Cscorrected) microscope of model Titan 80-300 ThemisZ from Thermo-Fisher Scientific (Waltham, Mass.). Samples were loaded onto holey-carbon coated copper grids for TEM analysis. The samples were placed onto grids in a solvent-free but ambient environment. Conventional bright-field TEM (BF-TEM) imaging technique was performed by operating the scope at the accelerating voltage of 300 kV. Furthermore, the microscope was set to a range of magnifications during the image acquisition process.

Ammonia Temperature Programmed Desorption ($NH_3$-TPD)

TPD experiments were carried out on a Micromeritics ASAP 2020 analyzer. The catalyst samples were first heated in a helium flow at 350° C. for 4 h, followed by cooling to 50° C. After cooling, the zeolites were saturated in ammonia, and the temperature of the samples was increased linearly at a rate of 10 K·min$^{-1}$. Ammonia was fed at atmospheric pressure with a 5 vol % $NH_3$ concentration diluted in helium. The ammonia desorption was continuously monitored by a thermal conductivity detector.

EXAMPLES

The following examples illustrate one or more additional features of the present disclosure. It should be understood that these examples are not intended to limit the scope of the disclosure or the appended claims in any manner.

Example 1

Figure 2A:
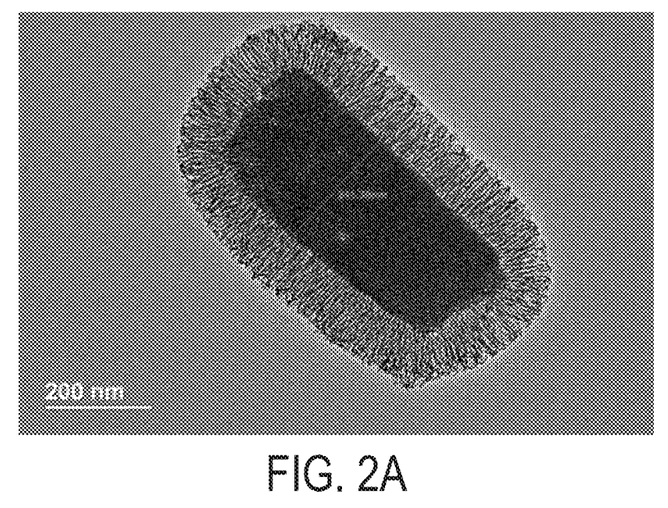
FIG. 2A is transmission electron microscopy (TEM) image of Sample 1 having a shell thickness of 100 nm, in accordance with one or more embodiments described herein.
Figure 2B:
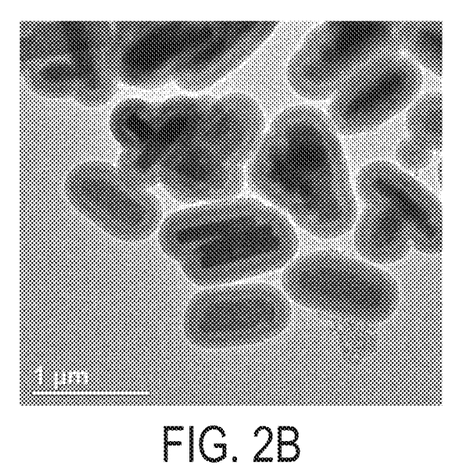
FIG. 2B is transmission electron microscopy (TEM) image of Sample 1 having a shell thickness of 100 nm, in accordance with one or more embodiments described herein.

In Example 1, an aqueous solution was prepared by adding 0.0329 moles of CTAB and 0.24 moles of urea to the 68.4 moles of water containing a vessel, which was stirred for 20 min at a speed of 3000 rpm. Then an oil solution was prepared by adding 15 g of ZSM-5 ($SiO_2/Al_2O_3$=371), 0.688 moles of 1-Pentanol, 0.266 moles of TEOS and 79.8 moles of cyclohexane in a vessel, which was stirred for 30 min at a speed of 3000 rpm. The ZSM-5 utilized was commercially available as ACS Material Molecular Sieve Nano H-ZSM-5 ACS Material LLC CAS-No.: 1318-02-1. Then, the aqueous solution and the oil solutions were mixed using a stirrer for 60 min at 5000 rpm to obtain an emulsion. Then, the emulsion was transferred to a sealed hydrothermal reactor and heated at 120° C. for 290 min. Then, HCl was added drop wise to the hydrothermally-treated emulsion until a pH of 5 was obtained, and then, 0.004 moles of aluminum sulfate octadecahydrate was added and stirred for 1 hour. The resulting reaction solution was then transferred to a sealed hydrothermal reactor and heated at 120° C. for 60 min with a ramping rate of 1° C. per min. The solids were then isolated by centrifugation, washed with distilled water followed by ethanol, and air-dried for 12 h. The as-synthesized material was then calcined at 550° C. for six hours in air atmosphere. The dried material was then calcined at 550° C. for six hours in air. Finally, 0.450 g of cobalt chloride dissolved in 120 ml of ethylene glycol was incorporated in the calcined material using 2 ml hydrazine as a reducing agent then sonicated for 60 mins. This was followed by reduction in hydrogen flow (5 ml/min) at 550° C. for 6 h. FIGS. 2A and 2B are transmission electron microscopy (TEM) images of Sample 1 having a shell thickness of 100 nm, in accordance with one or more embodiments described herein.

Example 2

Figure 3A:
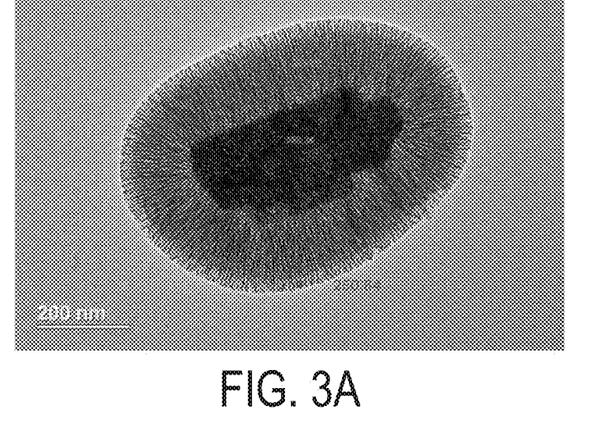
FIG. 3A is transmission electron microscopy (TEM) image of Sample 2 having a shell thickness of 280 nm, in accordance with one or more embodiments described herein.
Figure 3B:
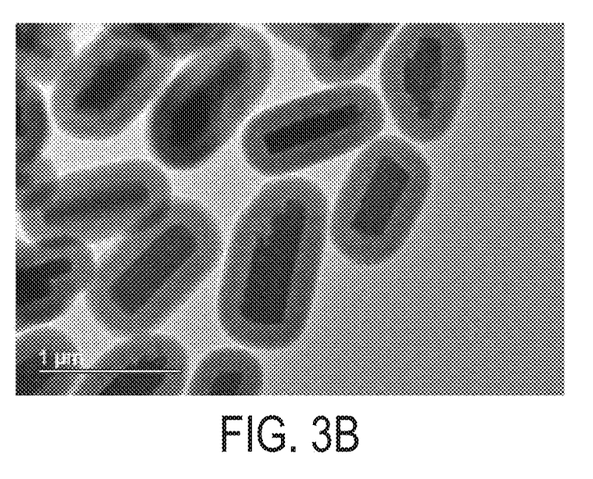
FIG. 3B is transmission electron microscopy (TEM) image of Sample 2 having a shell thickness of 280 nm, in accordance with one or more embodiments described herein.

In Example 2, an aqueous solution was prepared by adding 0.0329 moles of CTAB and 0.24 moles of urea to the 68.4 moles of water containing a vessel, which was stirred for 20 min at a speed of 3000 rpm. Then an oil solution was prepared by adding 15 g of ZSM-5 ($SiO_2/Al_2O_3$=371), 0.688 moles of 1-Pentanol, 0.532 moles of TEOS and 79.8 moles of cyclohexane in a vessel, which was stirred for 30 min at a speed of 3000 rpm. The ZSM-5 utilized was commercially available as ACS Material Molecular Sieve Nano H-ZSM-5 ACS Material LLC CAS-No.: 1318-02-1. Then, the aqueous solution and the oil solutions were mixed using a stirrer for 60 min at 5000 rpm to obtain an emulsion. Then, the emulsion was transferred to a sealed hydrothermal reactor and heated at 120° C. for 290 min. Then, HCl was added drop wise to the hydrothermally-treated emulsion until a pH of 5 was obtained, and then, 0.004 moles of aluminum sulfate octadecahydrate was added and stirred for 1 hour. The resulting reaction solution was then transferred to a sealed hydrothermal reactor and heated at 120° C. for 60 min with a ramping rate of 1° C. per min. The solids were then isolated by centrifugation, washed with distilled water followed by ethanol, and air-dried for 12 h. The as-synthesized material was then calcined at 550° C. for six hours in air atmosphere. The dried material was then calcined at 550° C. for six hours in air. Finally, 0.450 g of cobalt chloride dissolved in 120 ml of ethylene glycol was incorporated in the calcined material using 2 ml hydrazine as a reducing agent then sonicated for 60 mins. This was followed by reduction in hydrogen flow (5 ml/min) at 550° C. for 6 h. FIGS. 3A and 3B are transmission electron microscopy (TEM) image of Sample 2 having a shell thickness of 280 nm, in accordance with one or more embodiments described herein.

Example 3: Analysis of Example 1 and Example 2

Table 1 provided subsequently shows an analysis of Example 1 and Example 2, where the BET surface area, pore volume, and pore size were measured according to the test methods described herein.

TABLE 1

Analysis of Example 1 and Example 2

| Sample | BET S.A ($m^2/g$) | Pore Volume($cm^3/g$) | Pore Size (nm) |
|---|---|---|---|
| Example 1 | 480 | 0.63 | 6.10 |
| Example 2 | 501 | 0.80 | 7.70 |

From the above table, it was determined that as the shell thickness through modification of the Si/Al ratio, the surface area increased, which is further exemplified by the TEM images. From these results, it may be apparent that utilizing the disclosed catalyst systems, having a zeolite core and a microporous fibrous silica shell optionally comprising a heteroatom, would boost the conversion, propylene yield, or selectivity compared to catalyst systems comprising only a ZSM-5 zeolite.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A catalyst system comprising:
   a core comprising a ZSM-5 zeolite; and
   a shell comprising a mesoporous fibrous silica comprising KCC-1, the shell in direct contact with at least a majority of an outer surface of the core; and
   wherein:
   the catalyst system has a Si/Al molar ratio of from 20 to 40, the ZSM-5 zeolite has a Si/Al molar ratio of from 20 to 60,
   at least a portion of the shell has a thickness of from 50 nanometers (nm) to 600 nm, and
   the shell further comprises metallic nanoparticles comprising cobalt, as well as heteroatoms chosen from one or more of aluminum, boron, gallium, titanium, zirconium, and hafnium.

2. The catalyst system of claim 1, wherein the shell is in direct contact with and surrounds the core.

3. The catalyst system of claim 1, wherein at least a portion of the shell has a Brunauer-Emmett-Teller (BET) surface area of from 370 $m^2/g$ to 650 $m^2/g$.

4. The catalyst system of claim 1, wherein at least a portion of the shell has a Barrett, Joyner and Halenda (BJH) pore volume from 0.1 $cm^3/g$ to 1.0 $cm^3/g$.

5. The catalyst system of claim 1, wherein at least a portion of the shell has an average pore diameter between 4 nm to 20 nm.

6. A method of synthesizing the catalyst system of claim 1 having a core-shell morphology, the method comprising:
   mixing cetyltrimethylammonium bromide, urea, and water to produce a first solution;
   mixing a hydrocarbon solvent, tetraethyl orthosilicate, and a co-solvent to produce a second solution;
   mixing the first solution and the second solution to produce a mixture;
   hydrothermally treating the mixture to produce a treated mixture;
   combining an aluminum precursor and the treated mixture to produce a reaction solution; and
   hydrothermally treating the reaction solution to produce the catalyst system,
   wherein the method further comprises incorporating one or more metallic nanoparticles.

7. The method of claim 6, wherein hydrothermally treating the reaction solution is at a temperature of from 100° C. to 200° C. and a time period of from 0.5 hours to 5 hours.

8. The method of claim 6, wherein the aluminum precursor is aluminum sulfate octadecahydrate.

9. The method of claim 6, further comprising washing and calcining the catalyst system.

10. The method of claim 6, wherein the co-solvent is 1-pentanol.

11. The method of claim 6, further comprising adjusting the pH of the treated mixture.

12. A method for converting hydrocarbons, the method comprising contacting a hydrocarbon feed with a catalyst system, the catalyst system comprising:
   a core comprising a ZSM-5 zeolite; and
   a shell comprising a mesoporous fibrous silica comprising KCC-1, the shell in direct contact with at least a majority of an outer surface of the core; and wherein:
the catalyst system has a Si/Al molar ratio of from 20 to 40, the core has a Si/Al molar ratio of from 20 to 60,
at least a portion of the shell has a thickness of from 50 nanometers (nm) to 600 nm, and
the shell further comprises metallic nanoparticles comprising cobalt, as well as heteroatoms chosen from one or more aluminum, boron, gallium, titanium, zirconium, and hafnium.

13. The method of claim 12, wherein the feed comprises crude oil.

* * * * *